United States Patent [19]

Billings et al.

[11] 3,895,056

[45] July 15, 1975

[54] ALPHA-dl-4-ACETOXY-1-METHYL-3,3-DIPHENYLHEXYLAMINE AND SALTS

[75] Inventors: Ruth E. Billings, Indianapolis; Robert E. McMahon, Greenwood; Albert Pohland, Indianapolis, all of Ind.

[73] Assignee: Eli Lilly and Company, Indianapolis, Ind.

[22] Filed: Dec. 26, 1972

[21] Appl. No.: 317,970

[52] U.S. Cl................ 260/490; 260/570 R; 424/311
[51] Int. Cl............................................... C07c 93/00
[58] Field of Search........................ 260/490, 570 R

[56] References Cited
UNITED STATES PATENTS

| | | | |
|---|---|---|---|
| 2,649,445 | 8/1953 | Speeter | 260/490 |
| 3,021,360 | 2/1962 | Pohland | 260/490 |
| 3,435,073 | 3/1969 | Judd | 260/570.8 TC |

FOREIGN PATENTS OR APPLICATIONS

| | | | |
|---|---|---|---|
| 795,365 | 9/1968 | Canada | 260/570.8 TC |

*Primary Examiner*—Vivian Garner
*Attorney, Agent, or Firm*—James L. Rowe; Everet F. Smith

[57] ABSTRACT

α-dl-4-acetoxy-1-methyl-3,3-diphenylhexylamine and salts useful in producing analgesia.

2 Claims, No Drawings

ALPHA-Dl-4-ACETOXY-1-METHYL-3,3-DIPHENYLHEXYLAMINE AND SALTS

BACKGROUND OF THE INVENTION

Methadone, 6-dimethylamino-4,4-diphenyl-3-heptanone, is a synthetic narcotic analgesic developed during World War II in Germany—see Bockmuhl and Ehrhart, *Ann.*, 561, 52 (1948). Methadone has a single asymmetric carbon, the carbon adjacent to the amino group, and thus exists in two optically active forms, d-methadone and l-methadone, of which the l-isomer has the greater analgesic activity. Reduction of the ketone group of methadone with either sodium and alcohol or catalytically over platinum yields a group of compounds known as methadols. Since reduction of the ketone group produces a second asymmetric center, the methadols exist as two racemic pairs, the less soluble being denominated α-dl-methadol and the more soluble β-dl-methadol. Each racemic pair has been resolved into its optical antipodes, and it has been found that α-l-methadol is the most active analgesic of the four methadol isomers, although each of the other isomers has some analgesic activity.

Acetylation of the secondary alcohol group present in the methadols yields a more active group of analgesics known as the acetyl methadols. Like the methadols, the acetyl methadols occur as four stereoisomeric forms in two racemic pairs. Here, by contrast both α-l-acetylmethadol and α-d-acetylmethadol are useful analgesics. The above information was abstracted from the following articles: Pohland, Marshall and Carney, *J. Am. Chem. Soc.* 71, 460 (1949); Speeter et al., id. 57, Eddy, May and Mosetig, *J. Org. Chem.* 17, 321 (1952); May and Mosetig, *J. Org. Chem.*, 13., 459, 663 (1948), McMahon, Culp and Marshall, *J. Pharm. Exper. Therap.*, 149 436 (1965) and Leimbach and Eddy, *J. Pharm. Exper. Thereap.*, 110, 135 (1954). In addition, *Synthetic analgesics*, Janssen, Vol. 3, Part 1, (Pergamon Press, Oxford, 1960) summarizes the individual findings recorded in the above papers.

Compounds lacking one of the methyl groups in the amine function can be called "nor" derivatives; i.e., normethadol and noracetylmethadol. The normethadols are described in Eddy, May and Mosetig supra; the noracetylmethadols-α-dl-3-acetoxy-4,4-diphenyl-6-methylaminoheptane as well as the β-dl racemate- are described in Pohland U.S. Pat. No. 3,021,360, issued Feb. 13, 1962. U.S. Pat. No. 3,213,128, issued Oct. 19, 1965 describes an improved method of preparing noracetylmethadol.

SUMMARY OF THE INVENTION

This invention provides α-dl-4-acetoxy-1-methyl-3,3-diphenylhexylamine and its salts formed with pharmaceutically acceptable acids, said hexylamine being represented by the following formula:

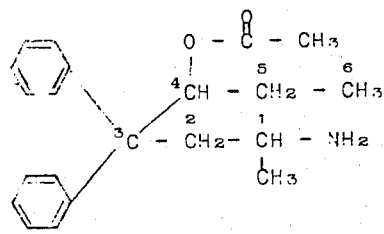

The above hexylamine can also be named didesmethylacetylmethadol and this name will be used hereafter interchangeably with the systematic name. In the above molecule, there are two asymmetric carbon atoms, those at the 1 and 4 positions of the hexane chain. Thus, as with the other methadols and acetylmethadols, the above structure represents 4 diastereoisomers occurring as two racemic pairs, the α-dl or less soluble racemate and the β-dl or more soluble racemate. Each racemate can in turn be resolved into its optical antipodes.

Also included within the scope of this invention are salts of the above α-dl-didesmethylacetylmethadol formed with pharmaceutically acceptable acids. Among such useful salts are sulfates, such as sulfate, pyrosulfate, and bisulfate; sulfites, such as sulfite and bisulfite; nitrate; phosphates, such as phosphate, monohydrogenphosphate, dihydrogenphosphate, metaphosphate and pyrophosphate; halides, such as chloride, bromide, iodide and fluoride; $C_1$–$C_{10}$ aliphatic carboxylates, such as acetate, propionate, decanoate, caprylate, acrylate, formate, isobutyrate, caprate, heptanoate and propiolate; $C_2$–$C_{10}$ aliphatic dicarboxylates, such as oxalate, malonate, succinate, suberate, sebacate, fumarate, maleate, butyne-1,4-dioate and hexyne-1,6-dioate; benzoates, such as benzoate, chlorobenzoate, methylbenzoate; phthalates, such as phthalate and terephthalate; benzenesulfonates, such as toluenesulfonate, chlorobenzenesulfonate and xylenesulfonate; phenyl $C_2$–$C_4$ alkanoates, such as phenylacetate, phenylpropionate and phenylbutyrate; citrate; $C_2$–$C_5$ α-hydroxyalkanoates, such as lactate, β-hydroxybutyrate and glycollate; $C_4$–$C_5$ α-hydroxyalkanedioates, such as malate and tartrate; phenate; carbonates, such as carbonate and bicarbonate; $C_1$–$C_3$ alkylsulfonates, such as methanesulfonate and propanesulfonate; and naphthalenesulfonates, such as napthalene-1-sulfonate and naphthalene-2-sulfonate.

α-dl-Didesmethylacetylmethadol and its salts, are prepared by the methods disclosed in the copending application of Richard N. Booher and Albert Pohland, Ser. No. 317,969, filed this even day herewith. According to this procedure, an acetylnormethadol, for example α-dl-acetylnormethadol in the form of its hydrochloride salt, is oxidized by potassium permanganate in aqueous tertiary butanol to yield 2-nitro-4,4-diphenyl-5-acetoxyheptane. Reduction of this product with metallic iron in the presence of an acid, for example hydrochloric acid, yields the primary amine, α-dl-didesmethylacetylmethadol, in the form of the hydrochloride salt. The free base is isolated from its salts by standard procedures.

α-d and α-l-didesmethylacetylmethadol are prepared by the above procedure by using α-d-acetylnormethadol or α-l-acetylnormethadol as starting materials in place of α-dl-acetylnormethadol.

In addition to their chemical preparation as outlined above, α-dl-didesmethylacetylmethadol and α-l-didesmethylacetylmethadol can be detected by special chromatographic techniques in the urine of rats fed α-dl-acetylmethadol and α-l-acetylmethadol respectively.

α-dl-didesmethylacetylmethadol is a heavy, viscous oil. Its hydrochloride salt melts at about 115°C. after isolation from ether solution, but is hydroscopic. Its maleate salt prepared in ethereal solution melts at about 165°–6°C. after recrystallization from a methanol-ethyl acetate solvent mixture.

Analysis Calc: Calculated: for $C_{21}K_{27}NO_2 \cdot C_4H_4O_4$ (441.524)

Theory: C, 68.01; H, 7.08; N, 3.17; O, 21.74
Found: C, 68.24; H, 7.31; N, 3.16; O, 22.03

Salts of α-dl-didesmethylacetylmethadol are prepared by dissolving the free base in ether and adding an equivalent of a suitable pharmaceutically-acceptable, nontoxic acid, also in ether except the hydrochloride salt which is usually prepared by passing gaseous hydrogen chloride into an ethereal solution of the base. The salts thus formed, as for example the sulfate, chloride and phosphate salts, are insoluble in ether and can be isolated by filtration. Alternatively, the amine base can be dissolved in ethanol and an equivalent of the acid added as an ethanolic solution. In this instance, since the salts thus formed are soluble in the reaction mixture, they are isolated by evaporation of the solvent in vacuo.

α-dl-Didesmethylacetylmethadol or a salt thereof with a pharmaceutically acceptable acid, is a potent long acting analgesic. It can be used in place of methadone in a methadone-maintenance program for the treatment of heroin addicts or addicts to other opiates. In utilizing α-dl-didesmethylacetylmethadol or a pharmaceutically acceptable salt thereof as an analgesic or in a methadone replacement program for the treatment of heroin addiction in humans, either oral or parenteral administration can be employed. For oral administration, α-dl-didesmethylacetylmethadol or a salt thereof with a pharmaceutically acceptable acid can be administered in any of the commonly used forms, such forms including powders, comprising a salt of α-dl-didesmethylacetylmethadol or capsules and tablets, including effervescent tablets, liquid solutions or suspensions including concentrates suitable for dilution with orange juice or other similar diluent, each pharmaceutical form containing a suitable α-dl-didesmethylacetylmethadol salt. One pharmaceutical form useful for oral administration is a tablet containing the following ingredients: 40 mg. of α-dl-didesmethylacetylmethadol hydrochloride, 1,500 mg. of cellulose, 100 mg. of mannitol, 75 mg. of a stearic acid, 200 mg. of starch, 30 mg. of potassium phosphate and 5 mg. of fumed silicon dioxide. The tablets are scored for use in regimens requiring less than a 40 mg. dose. Tablets containing the above ingredients are prepared in accordance with the standard procedures of the art.

For parenteral use, a salt of α-dl-didesmethylacetylmethadol with a pharmaceutically acceptable acid is customarily employed in an aqueous, usually isotonic, solution. Salts with relatively high aqueous solubility are preferred, such as the hydrochloride salt. An isotonic solution of α-dl-didesmethylacetylmethadol hydrochloride is placed in a rubber stoppered ampoule from which it can be administered to the patient with a hypodermic needle via the intramuscular route. For use as an analgesic, either oral or parenteral routes may be employed but for use in a methadone-maintenance type program, the oral route is generally preferred. The customary dose of α-dl-didesmethylacetylmethadol is about from 10 to 200 mg. per treatment.

Throughout the above description, α-dl-didesmethylacetylmethadol has been employed to illustrate the various pharmaceutical forms available for administration of the active analgesic. However, as will be appreciated by those skilled in the art, either of the pure optical antipodes, α-d and α-l-didesmethylacetyl-methadol, can be employed in place of the racemate, α-dl-didesmethylacetylmethadol. Dosage regimens employing one of the pure optical isomers will, of course, have to be adjusted to take account of differences in analgesic action.

We claim:

1. α-dl-4-acetoxy-1-methyl-3,3-diphenylhexylamine and salts thereof formed with nontoxic, pharmaceutically acceptable acids.

2. A compound according to claim 1, said compound being α-dl-1-methyl-4-acetoxy-3,3-diphenylhexylamine hydrochloride.

* * * * *